United States Patent
Palmas et al.

(10) Patent No.: US 9,205,394 B2
(45) Date of Patent: Dec. 8, 2015

(54) PROCESS AND APPARATUS FOR DISTRIBUTING FLUIDIZING GAS TO AN FCC RISER

(71) Applicant: UOP LLC, Des Plaines, IL (US)

(72) Inventors: Paolo Palmas, Des Plaines, IL (US); Michael S. Sandacz, Glen Ellyn, IL (US); Michael A. Stine, Lake Zurich, IL (US); Daniel R. Johnson, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/230,209

(22) Filed: Mar. 31, 2014

(65) Prior Publication Data

US 2015/0273424 A1    Oct. 1, 2015

(51) Int. Cl.
*B01J 8/18* (2006.01)
*B01J 8/20* (2006.01)

(52) U.S. Cl.
CPC *B01J 8/1818* (2013.01); *B01J 8/20* (2013.01); *B01J 2208/0084* (2013.01)

(58) Field of Classification Search
CPC .. B01J 8/388; B01J 8/085; B01J 2208/00902; B01J 2208/00911; B01J 2208/0092; B01J 2208/00929
See application file for complete search history.

(56) References Cited

U.S. PATENT DOCUMENTS

| | | |
|---|---|---|
| 2,902,432 A | 9/1959 | Codet et al. |
| 3,677,715 A | 7/1972 | Morrison et al. |
| 3,801,009 A | 4/1974 | Marshall, III |
| 3,881,656 A | 5/1975 | Markfelt et al. |
| 3,888,762 A | 6/1975 | Gerhold |
| 3,896,026 A | 7/1975 | MacLean et al. |
| 4,026,821 A | 5/1977 | Schoofs et al. |
| 4,283,273 A | 8/1981 | Owen |
| 4,309,308 A | 1/1982 | Vickers |
| 4,417,974 A | 11/1983 | Haunschild |
| 4,564,502 A | 1/1986 | Skraba |
| 4,572,780 A | 2/1986 | Owen et al. |
| 4,578,183 A * | 3/1986 | Chou et al. .................. 208/113 |
| 4,605,491 A | 8/1986 | Haddad et al. |
| 4,793,915 A | 12/1988 | Haddad et al. |
| 5,017,343 A | 5/1991 | Cetinkaya |
| 5,062,945 A | 11/1991 | Pappal et al. |
| 5,098,553 A | 3/1992 | Sapre |

(Continued)

FOREIGN PATENT DOCUMENTS

| | | |
|---|---|---|
| GB | 862961 A | 3/1961 |
| WO | 9301257 A1 | 1/1993 |
| WO | 2008119499 A1 | 10/2008 |

OTHER PUBLICATIONS

U.S. Appl. No. 14/230,192, filed Mar. 31, 2014.

*Primary Examiner* — Lessanework Seifu
(74) *Attorney, Agent, or Firm* — James C. Paschall

(57) ABSTRACT

A process and apparatus described is for distributing fluidizing gas to a riser. Fluidizing gas is delivered to a plenum below the riser. A first stream of fluidizing gas is distributed from the plenum into a chamber in a riser and a second stream of fluidizing gas is distributed from the plenum into the riser outside of the chamber. First nozzles in the plenum have a first outlet in the chamber and second nozzles in the plenum have a second outlet outside of the chamber. Streams of regenerated catalyst and carbonized catalyst may be passed to the riser and mixed around the chamber in a lower section of a riser.

20 Claims, 2 Drawing Sheets

(56) References Cited

U.S. PATENT DOCUMENTS

| | | |
|---|---|---|
| 5,143,874 A | 9/1992 | Ross |
| 5,176,815 A | 1/1993 | Lomas |
| 5,194,227 A | 3/1993 | Miller et al. |
| 5,205,993 A | 4/1993 | Leib et al. |
| 5,288,397 A | 2/1994 | Markham et al. |
| 5,310,477 A | 5/1994 | Lomas |
| 5,318,691 A | 6/1994 | Muldowney |
| 5,346,613 A | 9/1994 | Lomas et al. |
| 5,451,313 A | 9/1995 | Wegerer et al. |
| 5,462,652 A | 10/1995 | Wegerer |
| 5,489,154 A | 2/1996 | Algreen-Ussing |
| 5,514,271 A | 5/1996 | Buchanan et al. |
| 5,597,537 A | 1/1997 | Wegerer et al. |
| 5,840,254 A | 11/1998 | Carver, Jr. et al. |
| 5,858,207 A | 1/1999 | Lomas |
| 5,869,771 A | 2/1999 | Rajan et al. |
| 5,910,240 A | 6/1999 | Senior et al. |
| 5,944,982 A | 8/1999 | Lomas |
| 5,965,012 A | 10/1999 | Lomas |
| 6,010,618 A | 1/2000 | Lomas |
| 6,183,699 B1 | 2/2001 | Lomas |
| 6,238,548 B1 | 5/2001 | Upson et al. |
| 6,491,875 B1 | 12/2002 | Palmas |
| 6,538,169 B1 | 3/2003 | Pittman et al. |
| 6,616,899 B1 | 9/2003 | Upson |
| 6,616,900 B1 | 9/2003 | Lomas |
| 6,835,302 B2 | 12/2004 | Cammy et al. |
| 6,866,771 B2 | 3/2005 | Lomas et al. |
| 6,869,521 B2 | 3/2005 | Lomas |
| 6,902,593 B2 | 6/2005 | Miller et al. |
| 7,011,740 B2 | 3/2006 | Tallman et al. |
| 7,293,909 B2 | 11/2007 | Taniguchi |
| 7,435,331 B2 | 10/2008 | Peterson et al. |
| 7,674,439 B2 | 3/2010 | Jacobs et al. |
| 7,935,314 B2 | 5/2011 | Couch et al. |
| 8,025,717 B2 | 9/2011 | Dries et al. |
| 8,747,657 B2 | 6/2014 | Davydov et al. |
| 8,747,758 B2 | 6/2014 | Davydov et al. |
| 8,747,759 B2 | 6/2014 | Wolschlag et al. |
| 2003/0040105 A1 | 2/2003 | Sklar et al. |
| 2003/0116471 A1 | 6/2003 | Zhang et al. |
| 2008/0152552 A1 | 6/2008 | Hedrick et al. |
| 2009/0148360 A1 | 6/2009 | Hedrick et al. |
| 2010/0078357 A1 | 4/2010 | Couch et al. |
| 2010/0080741 A1 | 4/2010 | Couch et al. |
| 2011/0016856 A1 | 1/2011 | Wirth |
| 2012/0141333 A1 | 6/2012 | Ulas Acikgoz et al. |
| 2013/0150233 A1 | 6/2013 | Wolschlag et al. |
| 2013/0250716 A1 | 9/2013 | Palmas et al. |
| 2013/0250717 A1 | 9/2013 | Johnson et al. |
| 2013/0252803 A1 | 9/2013 | Johnson et al. |
| 2013/0252805 A1 | 9/2013 | Palmas et al. |

* cited by examiner

PROCESS AND APPARATUS FOR DISTRIBUTING FLUIDIZING GAS TO AN FCC RISER

BACKGROUND

The invention relates to a process and apparatus for distributing fluidizing gas to a reactor in which hydrocarbon feed is contacted with catalyst. A field of the invention may be the field of fluid catalytic cracking (FCC).

FCC is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or carbonized catalyst. This carbonized catalyst is often referred to as spent catalyst. However, this term may be misconstrued because the carbonized catalyst still has significant catalytic activity. Vaporous products are separated from carbonized catalyst in a reactor vessel. Carbonized catalyst may be subjected to stripping over an inert gas such as steam to strip entrained hydrocarbonaceous gases from the carbonized catalyst. A high temperature regeneration with oxygen within a regeneration zone operation burns coke from the carbonized catalyst which may have been stripped.

Although the carbonized catalyst carries coke deposits it may still have activity. U.S. Pat. No. 3,888,762 discloses mixing carbonized and regenerated catalyst for contact with the hydrocarbon feed. The regenerated catalyst may be in the range of 593° to 760° C. (1100° to 1400° F.) and the carbonized catalyst may be in the range of 482° to 621° C. (900° to 1150° F.). U.S. Pat. No. 5,597,537 discloses mixing the carbonized and regenerated catalyst in a blending vessel to allow the regenerated and carbonized catalyst to reach a temperature equilibrium before contacting the hydrocarbon feed. U.S. Pat. No. 7,935,314 B2 discloses baffles in the riser to obstruct upward catalyst flow to foster mixing. A mixed catalyst with more uniform temperature avoids undesirable hot spots that can generate nonselective cracking to reduce the value of the product hydrocarbons.

Inert fluidizing gas such as steam is distributed into the riser to fluidize the catalyst and to atomize the hydrocarbon feed. Fluidization of the catalyst pushes the catalyst up the riser so it can contact the hydrocarbon feed. Contact of feed and catalyst converts liquid feed to gaseous feed and gaseous feed converts to smaller gaseous products multiplying the volume of material in the riser, thereby providing additional motive force to push material up the riser. If more than one stream of catalyst is fed to the riser, the fluidization gas plays a significant role in facilitating mixing of the two streams.

Current known methods of distributing a fluidizing gas to a riser pose technical challenges. Typically, distribution would be accomplished by using a conventional steam ring distributor. However, equipment in the riser to facilitate mixing of catalyst streams makes location of a steam ring distributor cumbersome. Other known means of distributing the fluidizing gas, such as open pipes or pipes with slots at the end, are inefficient at evenly distributing the fluidizing gas the riser.

It may be desirable to provide a distributor for distributing fluidizing gas to an FCC reactor.

It may also be desirable to provide a distributor for distributing fluidizing gas to an FCC reactor that assists with mixing of separate streams of catalyst.

SUMMARY

This invention relates generally to an improved FCC process and apparatus. Specifically, this invention may relate to an improved fluidizing gas distributor and may be useful for FCC operation to mix two streams of catalyst in a riser.

One embodiment of the invention is a fluid catalytic process comprising feeding a stream of fluidizing gas to a plenum. A first stream of fluidizing gas is distributed from the plenum into a chamber in a riser and a second stream of fluidizing gas is distributed from the plenum into the riser outside of the chamber. A hydrocarbon feed stream is injected into the riser, and a first stream of catalyst is fed to the riser to contact the hydrocarbon feed stream. The hydrocarbon feed stream and the first stream of catalyst are passed up the riser.

Another embodiment of the invention is an apparatus for fluid catalysis comprising a riser. A plenum is located at a bottom of the riser, and a chamber is in the riser. A first nozzle is in the plenum with a first outlet in the chamber, and a second nozzle is in the plenum with a second outlet outside of the chamber. The first nozzle may be comprised in a plurality of nozzles with first outlets in the chamber, and the second nozzle may be comprised in a plurality of second nozzles with second outlets outside of the chamber in the riser.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through an intermediate vessel.

The term "feeding" means that the feed passes from a conduit or vessel directly to an object without passing through an intermediate vessel.

The term "passing" includes "feeding" and means that the material passes from a conduit or vessel to an object.

DETAILED DESCRIPTION

The apparatus and process described is a distributor for distributing a fluidizing gas to a riser to be contacted with catalyst. The fluidizing gas is typically inert, meaning that it will not react with other reactants in the reactor. Steam is a preferred fluidizing gas. The distributor may distribute fluidizing gas to a lower end of a riser in which regenerated catalyst and carbonized catalyst are mixed for contact with hydrocarbon feed. The present invention may be useful in any solids-gas contacting equipment. However, ready usefulness is found in an FCC unit.

Figure 1:
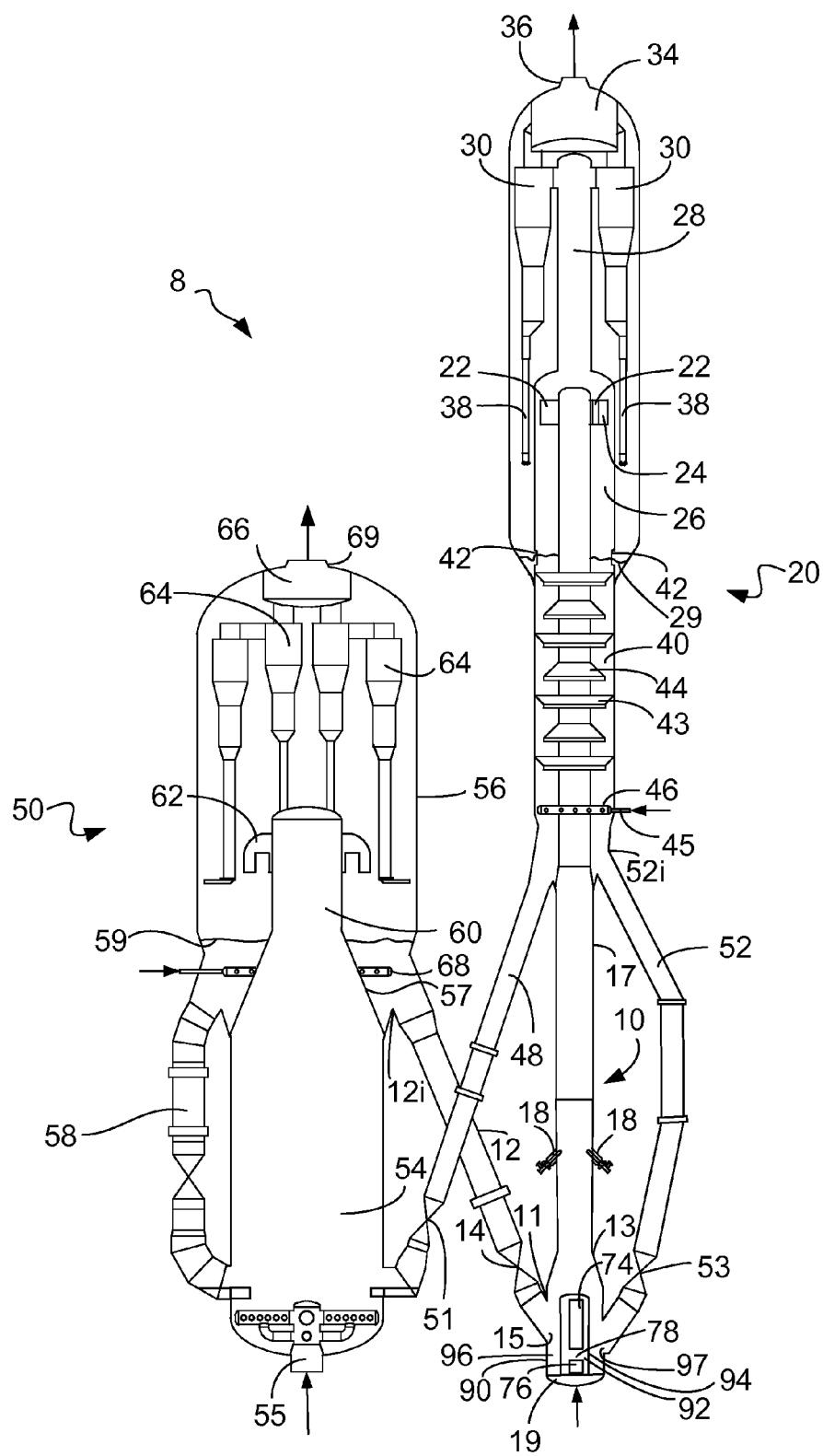
FIG. 1 is a schematic, elevational view of an FCC unit incorporating the present invention.

FIG. 1 shows an FCC unit 8 that includes a reactor vessel 20 and a regenerator vessel 50. A first regenerated catalyst conduit 12 transfers a first regenerated catalyst stream from the regenerator vessel 50 at a rate regulated by a control valve 14 through a regenerated catalyst inlet 15 of the first regenerated catalyst conduit 12 to the reactor riser 10. The first regenerated catalyst inlet 15 is in upstream communication with the riser 10. An optional second carbonized catalyst conduit 52 transfers a second carbonized catalyst stream from the reactor vessel 20 at a rate regulated by a control valve 53 through a carbonized catalyst inlet 97 of the second carbonized catalyst conduit 52 to the reactor riser 10. The optional second carbonized catalyst inlet 97 is in upstream communication with the riser 10.

The riser 10 is an elongated vertical tube typically made of killed carbon steel. The riser 10 may comprise a lower section 11 and an upper section 17. The upper section 17 may be made of chrome steel. The lower section 11 may include a flat bottom. The lower section 11 may have a larger inner diameter than the upper section 17 of the riser. The enlarged lower section 11 may include a frustoconical or curved transition section 13 that tapers between the enlarged diameter of the enlarged lower section and the narrowed diameter of a narrowed upper section 17 of the riser. If the hydrocarbon feed to the lower end 11 of the riser 10 is vaporous, the transition section 13 is less necessary or may be omitted. The first regenerated catalyst conduit 12 and the second optional carbonized catalyst conduit 52 may connect to the lower section 11 at a wall 90 of the lower section at inlets 15 and 97, respectively. The inner surface of the entire riser 10 may be coated with a refractory material.

A fluidization gas such as steam from a distributor 19 in the lower section 11 urges catalyst upwardly through the riser 10 at a relatively high density. An optional plurality of hydrocarbon feed distributors 18 located in the upper section 17 of the riser 10 above the optional transition section 13 inject a hydrocarbon feed into the riser 10 across the flowing stream of catalyst particles to distribute the hydrocarbon feed. The only hydrocarbon feed or a secondary hydrocarbon feed derived from cracking a primary feed may be fed to the riser 10 in the lower section 11. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst.

A conventional FCC feedstock and higher boiling hydrocarbon feedstock are suitable primary hydrocarbon feeds. The most common of such conventional feedstocks is a "vacuum gas oil" (VGO), which is typically a hydrocarbon material having a boiling range of from 343° to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention may also include mixtures of the above hydrocarbons and the foregoing list is not comprehensive.

The reactor vessel 20 is in downstream communication with the riser 10. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 to effect partial separation of gases from the catalyst. Two, three or four disengaging arms 22 may be used depending on the size of the FCC unit 8.

A FCC transport conduit 28 carries the hydrocarbon vapors, including stripped hydrocarbons, stripping media and entrained catalyst to one or more cyclones 30 in the reactor vessel 20 which separates carbonized catalyst from the product hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via the bed 29. A fluidizing conduit 45 delivers inert fluidizing gas, typically steam, to the stripping section 40 through a fluidizing gas distributor 46.

The stripping section 40 contains baffles 43, 44 or other equipment to promote contacting between a stripping gas and the catalyst. The stripped, carbonized catalyst leaves the stripping section 40 of the disengaging vessel 26 of the reactor vessel 20 with a lower concentration of entrained or adsorbed hydrocarbons than it had when it entered or if it had not been subjected to stripping. A first portion or all of the carbonized catalyst leaves the disengaging vessel 26 of the reactor vessel 20 through a spent catalyst conduit 48 and feeds into the regenerator vessel 50 at a rate regulated by a control valve 51. An optional second portion of the carbonized catalyst that has been coked in the reactor riser 10 leaves the disengaging vessel 26 of the reactor vessel 20 and is fed through the second carbonized catalyst conduit 52 back to the riser 10 at a rate regulated by a control valve 53. The optional second carbonized catalyst conduit 52 is in downstream communication with the reactor vessel 20 and has an upstream, inlet end 52i connected to the disengaging vessel 26 of the reactor vessel 20. The second carbonized catalyst conduit 52 is in downstream communication with the outlet port 24 of the riser 10 and in upstream communication with a carbonized catalyst inlet 97 of the second carbonized catalyst conduit 52 to the riser 10.

The riser 10 of the FCC process is maintained at high temperature conditions which generally include a temperature above about 425° C. (797° F.). In an embodiment, the reaction zone is maintained at cracking conditions which include a temperature of from about 480° to about 621° C. (896° to 1150° F.) at the riser outlet port 24 and a pressure from about 69 to about 517 kPa (gauge) (10 to 75 psig) but typically less than about 275 kPa (gauge) (40 psig). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to about 2-35 wt-% of feed. Typically, however, the steam rate will be between about 2 and about 7 wt-% for maximum gasoline production and about 10 to about 20 wt-% for maximum light olefin production. The average residence time of catalyst in the riser may be less than about 5 seconds. The type of catalyst employed in the process may be chosen from a variety of commercially available catalysts. A catalyst comprising a zeolitic material such as Y zeolite is preferred, but the older style amorphous catalysts can be used if desired. Additionally, shape-selective additives such as ZSM-5 may be included in the catalyst composition to increase light olefin production.

The regenerator vessel 50 is in downstream communication with the reactor vessel 20. In the regenerator vessel 50, coke is combusted from the portion of carbonized catalyst delivered to the regenerator vessel 50 by contact with an oxygen-containing gas such as air to provide regenerated catalyst. The regenerator vessel 50 may be a combustor type of regenerator, which may use hybrid turbulent bed-fast fluidized conditions in a high-efficiency regenerator vessel 50 for completely regenerating carbonized catalyst. However, other regenerator vessels and other flow conditions may be suitable for the present invention. The spent catalyst conduit 48 feeds carbonized catalyst to a first or lower chamber 54 defined by outer wall 56 through a spent catalyst inlet chute. The carbonized catalyst from the reactor vessel 20 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the lower chamber 54 of the regenerator vessel 50 and is distributed by a distributor 55. As the combustion gas enters the lower chamber 54, it contacts carbonized catalyst entering from chute and lifts the catalyst at a superficial velocity of combustion gas in the lower chamber 54 of perhaps at least 1.1 m/s (3.5 ft/s). In an embodiment, the lower chamber 54 may have a catalyst density of from 48 to 320 kg/m$^3$ (3 to 20 lb/ft$^3$) and a superficial gas velocity of 1.1 to 6.1 m/s (3.5 to 10 ft/s). The oxygen in the combustion gas contacts the carbonized catalyst and combusts carbonaceous deposits from the catalyst to at least partially regenerate the catalyst and generate flue gas.

In an embodiment, to accelerate combustion of the coke in the lower chamber 54, hot regenerated catalyst from a dense catalyst bed 59 in an upper or second chamber 56 may be recirculated to the lower chamber 54 via an external recycle catalyst conduit 58 regulated by a control valve. Hot regenerated catalyst enters the lower chamber 54 through an inlet chute. Recirculation of regenerated catalyst, by mixing hot catalyst from the dense catalyst bed 59 with relatively cooler carbonized catalyst from the spent catalyst conduit 48 entering the lower chamber 54, raises the overall temperature of the catalyst and gas mixture in the lower chamber 54.

The mixture of catalyst and combustion gas in the lower chamber 54 ascend through a frustoconical transition section 57 to the transport, riser section 60 of the lower chamber 54. The riser section 60 defines a tube which is preferably cylindrical and extends preferably upwardly from the lower chamber 54. The mixture of catalyst and gas travels at a higher superficial gas velocity than in the lower chamber 54. The increased gas velocity is due to the reduced cross-sectional area of the riser section 60 relative to the cross-sectional area of the lower chamber 54 below the transition section 57. Hence, the superficial gas velocity may usually exceed about 2.2 m/s (7 ft/s). The riser section 60 may have a lower catalyst density of less than about 80 kg/m$^3$ (5 lb/ft$^3$).

The mixture of catalyst particles and flue gas is discharged from an upper portion of the riser section 60 into the upper chamber 56. Substantially completely regenerated catalyst may exit the top of the transport, riser section 60, but arrangements in which partially regenerated catalyst exits from the lower chamber 54 are also contemplated. Discharge is effected through a disengaging device 62 that separates a majority of the regenerated catalyst from the flue gas. In an embodiment, catalyst and gas flowing up the riser section 60 impact a top elliptical cap of the riser section 60 and reverse flow. The catalyst and gas then exit through downwardly directed discharge outlets of disengaging device 62. The sudden loss of momentum and downward flow reversal cause a majority of the heavier catalyst to fall to the dense catalyst bed 59 and the lighter flue gas and a minor portion of the catalyst still entrained therein to ascend upwardly in the upper chamber 56. Cyclones 64 further separate catalyst from ascending gas and deposits catalyst through dip legs into dense catalyst bed 59. Flue gas exits the cyclones 64 and collects in a plenum 66 for passage to an outlet nozzle 69 of regenerator vessel 50 and perhaps into a flue gas or power recovery system (not shown). Catalyst densities in the dense catalyst bed 59 are typically kept within a range of from about 640 to about 960 kg/m$^3$ (40 to 60 lb/ft$^3$). A fluidizing conduit delivers fluidizing gas, typically air, to the dense catalyst bed 59 through a fluidizing distributor 68. In a combustor-style regenerator, approximately no more than 2% of the total gas requirements within the process enter the dense catalyst bed 59 through the fluidizing distributor 68. In this embodiment, gas is added here not so much for combustion purposes but for fluidizing purposes, so the catalyst will fluidly exit through the catalyst conduits 58 and 12. In the case where partial combustion is effected in the lower chamber 54, greater amounts of combustion gas may be fed to the upper chamber 56 through fluidizing conduit 68.

The regenerator vessel 50 may typically require 14 kg of air per kg of coke removed to obtain complete regeneration. When more catalyst is regenerated, greater amounts of feed may be processed in a conventional reactor riser. The regenerator vessel 50 typically has a temperature of about 594 to about 732° C. (1100 to 1350° F.) in the lower chamber 54 and about 649 to about 760° C. (1200 to 1400° F.) in the upper chamber 56. The regenerated catalyst conduit 12 is in downstream communication with the regenerator vessel 50 and communicates with the riser 10. The regenerated catalyst conduit 12 connects to the regenerator at an upstream inlet end 12*i*. Regenerated catalyst from dense catalyst bed 59 is transported through regenerated catalyst conduit 12 as a first stream of catalyst from the regenerator vessel 50 back to the reactor riser 10 through the control valve 14 where it again contacts feed as the FCC process continues. Carbonized catalyst in the optional second catalyst conduit 52 comprises a second stream of catalyst.

In an embodiment shown in FIG. 1 which utilizes two catalyst conduits and two catalyst streams, the first regenerated catalyst conduit 12 and the second carbonized catalyst conduit 52 connect to and are in communication with the riser 10. The first stream of regenerated catalyst in the first regenerated catalyst conduit 12 and the second stream of carbonized catalyst in the second carbonized catalyst conduit 52 are fed to the riser 10 and mixed together. One or both of the first regenerated catalyst conduit 12 and the second carbonized catalyst conduit 52 may tangentially connect to the lower section 11 of the riser 10 tangentially to impart an angular motion to catalyst discharged into the riser to promote mixing therein. Additionally, ramps may be installed at the connection between one or both of the first regenerated catalyst conduit 12 and the second carbonized catalyst conduit 52 and the lower section 11 of the riser 10 also to promote mixing in the lower section 11.

The riser may include a chamber 92. In an aspect, the lower section 11 of the riser 10 may include the chamber 92. In an aspect, the chamber 92 is contained in the lower section 11 of the riser. The chamber 92 may have an outer wall 94 that may be spaced apart from an inner surface of the wall 90 of the lower section 11 of the riser 10. In an aspect, the chamber 92 is radially centered in the lower section 11 of the riser 10. In other words, although not shown, the chamber 92 has a central longitudinal axis aligned with a central longitudinal axis of the riser 10. In a further aspect, the outer wall 94 of the chamber is a vertical wall. The inner diameter of the chamber 92 may be between 1 and 3 and preferably between 1.5 and 2.5 times the inner diameter of the largest one of the first regenerated catalyst conduit 12 and the second carbonized catalyst conduit 52.

The wall 94 of the chamber 92 and the wall 90 of the riser define a space 96 therebetween. In an aspect, chamber 92 and the lower section 11 may each be tubular so that together they define an annular space 96 or annulus between the wall 94 of the chamber 92 and the wall 90 of the lower section 11 of the riser 10. The first regenerated catalyst conduit 12 and the second carbonized catalyst conduit 52 may communicate with the space 96, so the first regenerated catalyst conduit 12 feeds the first stream of regenerated catalyst to the space 96 and the second carbonized catalyst conduit 52 feeds the second stream of carbonized catalyst to the space 96. The chamber 92 may include an opening 74 or a plurality of openings 74, 76. In FIG. 1, the chamber has two openings 74, 76 horizontally aligned with each other and separated by a band 78. Other openings may be circumferentially spaced about the outer wall 94 of the chamber 92. The first stream of regenerated catalyst from the first catalyst inlet 15 passes around the chamber 92 and into the openings 74, 76 to mix with the second stream of carbonized catalyst from the second catalyst inlet 97, and the second stream of catalyst from the second catalyst inlet 97 passes around the chamber 92 and into the openings 74, 76 to mix with the first stream of catalyst from the first catalyst inlet 15. The catalyst in the chamber 92 is fluidized by a first stream of fluidizing gas from the fluidizing distributor 19. The catalyst in the space 96 is fluidized by a second stream of fluidizing gas from the fluidizing distributor 19. The mixed stream of the first stream of catalyst and the second stream of catalyst then pass up the riser.

The chamber may be located in a lower section 11 of the riser 10. The upper section 17 of the riser 10 may be above the chamber 92. In an aspect, the frustoconical transition section 13 of the riser which may be between an enlarged section 11 and a narrowed upper section 17 to transition the larger diameter of the enlarged lower section 11 to the narrowed upper section 17 may transition a mixed stream of the first stream of regenerated catalyst and the second stream of carbonized catalyst from the enlarged lower section to the narrowed upper section as the mixed stream of catalyst is passed up the riser. In an aspect, the chamber 92 does not extend into the transition section 13, so the transitioning occurs after the mixed stream of catalyst is passed above the chamber 92.

In an aspect, primary feed distributors 18 may be disposed in the upper section 17 of the riser 10 above the lower section 11, the transition section 13 and the chamber 92. Consequently, the hydrocarbon feed stream may be injected into the ascending mixed stream of the first stream of regenerated catalyst and the second stream of carbonized catalyst. The hydrocarbon feed stream and the first stream of catalyst mixed with the second stream of catalyst may then pass up the riser while cracking of the hydrocarbon feed occurs.

It is anticipated that the chamber 92 be made of stainless steel such as 300 Series stainless steel and be lined with refractory. Additionally, the chamber 92 may be made of or coated with a ceramic or other material that resists erosion.

Figure 2:
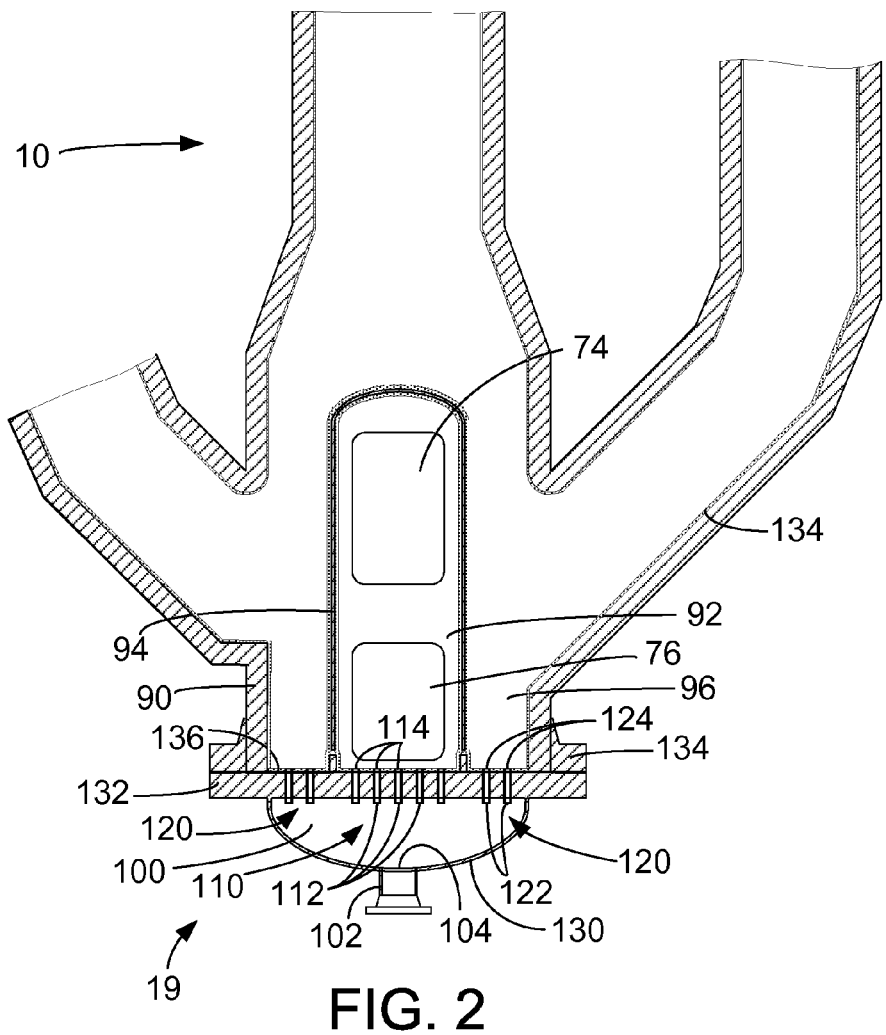
FIG. 2 is an enlarged, partial sectional view of FIG. 1.

FIG. 2 is an enlarged, partial sectional view of the lower section of the riser which illustrates the fluidizing gas distributor of FIG. 1. The fluidizing gas distributor 19 comprises a plenum 100 located at a bottom of the riser 10. The plenum 100 may be disposed below the chamber 92. A nozzle 102 to the plenum 100 feeds fluidizing gas to the plenum through an inlet 104. A first nozzle 110 in the plenum 100 has a first inlet 112 in the plenum 100 and a first outlet 114 in the chamber 92. A second nozzle 120 in the plenum 100 has second inlet 122 in the plenum 100 and a second outlet 124 outside of the chamber 92 in the riser 10. In an aspect, the second outlet 124 is located in the space 96 between the outer wall 94 of the chamber 92 and the wall 90 of the riser 10. The first nozzle 110 may be comprised in a plurality of first nozzles 110 in the plenum 100 all with first inlets 112 in the plenum 100 and first outlets 114 in the chamber 92. The second nozzle 120 may be comprised in a plurality of second nozzles 120 in the plenum 100 all with second inlets 122 in the plenum 100 and second outlets 124 outside of the chamber 92 in the riser 10 which in an aspect may be in the space 96.

The first nozzles 110 distribute a first stream of fluidizing gas from the plenum 100 into the chamber 92 in the riser 10. The second nozzles 120 distribute a second stream of fluidizing gas from the plenum 100 into the riser 10 outside of the chamber 92 which in an aspect may be in the space 96. The first stream of fluidizing gas fluidizes catalyst in the chamber 92 and pushes catalyst out of the openings 74, 76 in the chamber 92. The second stream of fluidizing gas fluidizes catalyst in the riser 10 outside of the 92 chamber and pushes catalyst up the riser 10. The first stream and the second stream of fluidizing gas push the catalyst up the riser at a superficial velocity of 1.5 m/s (5 ft/s) to 4.6 m/s (15 ft/s), preferably 2.4 m/s (8 ft/s) to 3.7 m/s (12 ft/s). The first stream of fluidizing gas from the first nozzles 110 should account for about 20 to about 40 wt % of the fluidizing gas from the plenum 100 entering the riser 10; whereas, the second stream of fluidizing gas should account for about 60 to about 80 wt % of the fluidizing gas from the plenum entering the riser 10. The nozzles may be evenly distributed to have an equal number of first nozzles 110 per square foot located in the chamber 92 as the second nozzles 120 located in the riser 10 outside of the chamber 92. The distribution of fluidizing gas given between the first stream of fluidizing gas from the first nozzles 110 and the second stream of fluidizing gas from the second nozzles 120 may be based on the even distribution of nozzles per given area.

The plenum 100 may be equipped with a rounded or elliptical bottom 130 and a flat top 132. The flat top 132 may comprise a blind flange that is connected such as by bolts to an outer flange 134 of the wall 90 of said riser 10. In an aspect, the first nozzle(s) 110 and the second nozzle(s) 120 extend through the flat top 132 comprising the blind flange. The outer wall 94 of the chamber 92 may be connected to the upper surface of the flat top 132 comprising the blind flange. Refractory 134 may line the inner surface of the riser 10 along the wall 90 and refractory 136 may line the upper surface of the flat top 132 which provides the bottom of the riser 10. Refractory may also line an inner surface and an outer surface of the wall 94 of the chamber 92. The first nozzles 110 and the second nozzles 120 may extend through the refractory 136.

Figure 3:
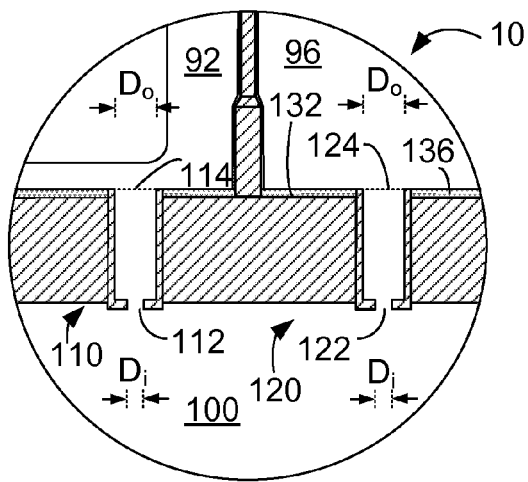
FIG. 3 is a further enlarged, partial view of FIG. 2.

The profile of the nozzles 110, 120 are shown for illustrative purposes in FIG. 3 which is an enlarged portion of FIG. 2. Each first nozzle 110 and each second nozzle 120 has the first inlet 112 and the second inlet 122, respectively, in the plenum 100. The first nozzle 110 has a first outlet 114 in the chamber 92 and the second nozzle has the second outlet 124 in the riser 10 outside of the chamber 92 in the space 96. The first stream of fluidizing gas from the plenum 100 enters the first inlet 112 of the first nozzle 110. The second stream of fluidizing gas from the plenum 100 enters the second inlet 122 of the second nozzle 120. The first inlet 112 and the second inlet 122 comprise an opening having an inner diameter $D_i$. The first stream of fluidizing gas passes from the plenum 100 upwardly through the first nozzle(s) 110 through the top 132 of the plenum and the refractory lining 136 out of the first outlet 114 and into the chamber 92 in the riser 10. The second stream of fluidizing gas passes from the plenum 100 upwardly through the second nozzle(s) 120 through the top 132 of the plenum 100 and the refractory lining 136 out of the second outlet 124 and into the riser 10 outside of the chamber 92 in the space 96. In an aspect, the first outlet(s) 114 and the second outlet(s) 124 have ends that are flush with the surface of the refractory 136. The first outlet(s) 114 and the second outlet(s) 124 comprise openings shown in dashed lines having an inner diameter $D_o$. The fluidizing gas may be distributed through a plurality of dual-diameter nozzles 110, 120 in to the riser. The dual diameter nozzles 110, 120 provide a means to independently set the jet outlet velocity and the distributor pressure drop of the fluidizing gas stream. The jet outlet velocity is adjusted by the number and area of the outlets 114, 124 of the nozzles 110, 120 while the pressure drop is set by the number and area of the inlets 112, 122 in the plenum 100. The nozzles 110, 120 typically will have inner diameters $D_i$ in the inlets 112, 122 that are smaller than the inner diameters $D_o$ of the outlets 122, 124.

SPECIFIC EMBODIMENTS

While the following is described in conjunction with specific embodiments, it will be understood that this description is intended to illustrate and not limit the scope of the preceding description and the appended claims.

A first embodiment of the invention is a fluid catalytic process comprising feeding a stream of fluidizing gas to a plenum; distributing a first stream of fluidizing gas from the plenum into a chamber in a riser; distributing a second stream of fluidizing gas from the plenum into the riser outside of the chamber; injecting a hydrocarbon feed stream into the riser; feeding a first stream of catalyst to the riser to contact the hydrocarbon feed stream; and passing the hydrocarbon feed stream and the first stream of catalyst up the riser. An embodiment of the invention is one, any or all of prior embodiments in this paragraph up through the first embodiment in this paragraph further comprising feeding a second stream of catalyst to the riser to contact the hydrocarbon feed stream. An embodiment of the invention is one, any or all of prior embodiments in this paragraph up through the first embodiment in this paragraph further comprising passing the first stream of catalyst around and into the chamber to mix with the second stream of catalyst; and passing the second stream of catalyst around and into the chamber to mix with the first stream of catalyst. An embodiment of the invention is one, any or all of prior embodiments in this paragraph up through the first embodiment in this paragraph wherein the first stream of fluidizing gas fluidizes catalyst in the chamber and pushes catalyst out of the chamber. An embodiment of the invention is one, any or all of prior embodiments in this paragraph up through the first embodiment in this paragraph wherein the second stream of fluidizing gas fluidizes catalyst in the riser outside of the chamber and pushes catalyst up the riser. An embodiment of the invention is one, any or all of prior embodiments in this paragraph up through the first embodiment in this paragraph further comprising passing the first stream of fluidizing gas and the second stream of fluidizing gas upwardly through nozzles in a top of the plenum into the riser. An embodiment of the invention is one, any or all of prior embodiments in this paragraph up through the first embodiment in this paragraph further comprising transitioning the stream of catalyst and the hydrocarbon feed stream from an enlarged lower section to a narrowed upper section as they are passed up the riser.

A second embodiment of the invention is a fluid catalytic process comprising feeding a stream of fluidizing gas to a plenum; distributing a first stream of fluidizing gas from the plenum into a chamber in a riser; distributing a second stream of fluidizing gas from the plenum into the riser outside of the chamber; injecting a hydrocarbon feed stream into the riser; feeding a first stream of catalyst to the riser to contact the hydrocarbon feed stream; and feeding a second stream of catalyst to the riser to contact the hydrocarbon feed stream passing the hydrocarbon feed stream and the stream of catalyst up the riser. An embodiment of the invention is one, any or all of prior embodiments in this paragraph up through the second embodiment in this paragraph further comprising passing the first stream of catalyst around and into the chamber to mix with the second stream of catalyst; and passing the second stream of catalyst around and into the chamber to mix with the first stream of catalyst. An embodiment of the invention is one, any or all of prior embodiments in this paragraph up through the second embodiment in this paragraph wherein the first stream of fluidizing gas fluidizes catalyst in the chamber and pushes catalyst out of the chamber. An embodiment of the invention is one, any or all of prior embodiments in this paragraph up through the second embodiment in this paragraph wherein the second stream of fluidizing gas fluidizes catalyst in the riser outside of the chamber and pushes catalyst up the riser. An embodiment of the invention is one, any or all of prior embodiments in this paragraph up through the second embodiment in this paragraph further comprising passing the first stream of fluidizing gas and the second stream of fluidizing gas upwardly through nozzles in a top of the plenum into the riser. An embodiment of the invention is one, any or all of prior embodiments in this paragraph up through the second embodiment in this paragraph further comprising transitioning the first stream of catalyst, the second stream of catalyst and the hydrocarbon feed stream from an enlarged lower section to a narrowed upper section as they are passed up the riser.

A third embodiment of the invention is a fluid catalytic process comprising feeding a stream of fluidizing gas to a plenum; distributing a first stream of fluidizing gas from the plenum into a chamber in a riser by passing the first stream of fluidizing gas upwardly through nozzles in a top of the plenum into the riser; distributing a second stream of fluidizing gas from the plenum into the riser outside of the chamber by passing the second stream of fluidizing gas upwardly through nozzles in a top of the plenum into the riser outside of the chamber; injecting a hydrocarbon feed stream into the riser; feeding a first stream of catalyst to the riser to contact the hydrocarbon feed stream; and passing the hydrocarbon feed stream and the stream of catalyst up the riser. An embodiment of the invention is one, any or all of prior embodiments in this paragraph up through the third embodiment in this paragraph further comprising feeding a second stream of catalyst to the riser to contact the hydrocarbon feed stream. An embodiment of the invention is one, any or all of prior embodiments in this paragraph up through the third embodiment in this paragraph further comprising passing the first stream of catalyst around and into the chamber to mix with the second stream of catalyst; and passing the second stream of catalyst around and into the chamber to mix with the first stream of catalyst. An embodiment of the invention is one, any or all of prior embodiments in this paragraph up through the third embodiment in this paragraph wherein the first stream of fluidizing gas fluidizes catalyst in the chamber and pushes catalyst out of the chamber. An embodiment of the invention is one, any or all of prior embodiments in this paragraph up through the third embodiment in this paragraph wherein the second stream of fluidizing gas fluidizes catalyst in the riser outside of the chamber and pushes catalyst up the riser. An embodiment of the invention is one, any or all of prior embodiments in this paragraph up through the third embodiment in this paragraph further comprising transitioning the stream of catalyst and the hydrocarbon feed stream from an enlarged lower section to a narrowed upper section as they are passed up the riser.

A fourth embodiment of the invention is an apparatus for fluid catalysis comprising a riser; a plenum located at a bottom of the riser; a chamber in the riser; and a first nozzle in the plenum with a first outlet in the chamber; a second nozzle in the plenum with a second outlet outside of the chamber. An embodiment of the invention is one, any or all of prior embodiments in this paragraph up through the fourth embodiment in this paragraph further comprising an outer wall of the chamber spaced from a wall of the riser and the second outlet is located between the outer wall and the chamber. An embodiment of the invention is one, any or all of prior embodiments in this paragraph up through the fourth embodiment in this paragraph further comprising an opening in the outer wall of the chamber. An embodiment of the invention is one, any or all of prior embodiments in this paragraph up through the fourth embodiment in this paragraph further comprising a first catalyst inlet in communication with the riser; a second catalyst inlet in communication with the riser; and the chamber in the riser between the first catalyst inlet and the second catalyst inlet. An embodiment of the invention is one, any or all of prior embodiments in this paragraph up through the fourth embodiment in this paragraph wherein a first catalyst conduit is connected to the riser at the first catalyst inlet and a second catalyst conduit is connected to the riser at the second catalyst inlet and the chamber is interposed between the first catalyst inlet and the second catalyst inlet. An embodiment of the invention is one, any or all of prior embodiments in this paragraph up through the fourth embodiment in this paragraph wherein a first nozzle has a first inlet and the second nozzle has a second inlet and the first inlet and the second inlet is in the plenum. An embodiment of the invention is one, any or all of prior embodiments in this paragraph up through the fourth embodiment in this paragraph further including a plurality of first nozzles each with first inlets in the plenum and first outlets in the chamber and a plurality of second nozzles each with second inlets in the plenum and second outlets outside of the chamber. An embodiment of the invention is one, any or all of prior embodiments in this paragraph up through the fourth embodiment in this paragraph further including a nozzle to the plenum for passing fluidizing gas to the plenum through a plenum inlet. An embodiment of the invention is one, any or all of prior embodiments in this paragraph up through the fourth embodiment in this paragraph wherein the first inlet has a smaller inner diameter than the first outlet of the first nozzle and the second inlet has a smaller inner diameter than the second outlet of the second nozzle. An embodiment of the invention is one, any or all of prior embodiments in this paragraph up through the fourth embodiment in this paragraph wherein the plenum has a rounded bottom and a flat top. An embodiment of the invention is one, any or all of prior embodiments in this paragraph up through the fourth embodiment in this paragraph wherein the flat top comprises a blind flange that is connected to an outer flange of the wall of the riser. An embodiment of the invention is one, any or all of prior embodiments in this paragraph up through the fourth embodiment in this paragraph wherein the first nozzle and the second nozzle extend through the flat top. An embodiment of the invention is one, any or all of prior embodiments in this paragraph up through the fourth embodiment in this paragraph wherein the outer wall of the chamber is connected a top of the flat top.

A fifth embodiment of the invention is an apparatus for fluid catalysis comprising a riser; a first catalyst inlet in the riser; a second catalyst inlet in the riser; a plenum located at a bottom of the riser; a chamber in the riser between the first catalyst inlet and the second catalyst inlet and an opening in an outer wall of the chamber; and a first nozzle in the plenum with a first outlet in the chamber; a second nozzle in the plenum with a second outlet outside of the chamber. An embodiment of the invention is one, any or all of prior embodiments in this paragraph up through the fifth embodiment in this paragraph wherein a first catalyst conduit is connected to the riser at the first catalyst inlet and a second catalyst conduit is connected to the riser at the second catalyst inlet.

A sixth embodiment of the invention is an apparatus for fluid catalysis comprising a riser; a plenum located at a bottom of the riser; a chamber in the riser; and a first nozzle with a first inlet in the plenum and a first outlet in the chamber; a second nozzle with a second inlet in the plenum and a second outlet outside of the chamber. An embodiment of the invention is one, any or all of prior embodiments in this paragraph up through the sixth embodiment in this paragraph further including a conduit to the plenum for passing fluidizing gas to the plenum through a plenum inlet. An embodiment of the invention is one, any or all of prior embodiments in this paragraph up through the sixth embodiment in this paragraph wherein the plenum has a rounded bottom and a flat top comprising a blind flange that is connected to an outer flange of a wall of the riser. An embodiment of the invention is one, any or all of prior embodiments in this paragraph up through the sixth embodiment in this paragraph wherein the first nozzle and the second nozzle extend through the blind flange. An embodiment of the invention is one, any or all of prior embodiments in this paragraph up through the sixth embodiment in this paragraph wherein the outer wall of the chamber is connected a top of the blind flange.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. An apparatus for fluid catalysis comprising:
a riser;
a plenum located at a bottom of said riser;
a chamber in said riser; and
a first nozzle in said plenum with a first outlet in said chamber;

a second nozzle in said plenum with a second outlet outside of said chamber.

2. The apparatus of claim 1 further comprising an outer wall of said chamber spaced from a wall of said riser and said second outlet is located between said outer wall and said chamber.

3. The apparatus of claim 2 further comprising an opening in said outer wall of said chamber.

4. The apparatus of claim 1 further comprising:
a first catalyst inlet in communication with said riser;
a second catalyst inlet in communication with said riser; and
said chamber in said riser between said first catalyst inlet and said second catalyst inlet.

5. The apparatus of claim 4 wherein a first catalyst conduit is connected to said riser at said first catalyst inlet and a second catalyst conduit is connected to said riser at said second catalyst inlet and the chamber is interposed between said first catalyst inlet and said second catalyst inlet.

6. The apparatus of claim 1 wherein the first nozzle has a first inlet and said second nozzle has a second inlet and said first inlet and said second inlet are in said plenum.

7. The apparatus of claim 6 further including a plurality of first nozzles each with first inlets in said plenum and first outlets in said chamber and a plurality of second nozzles each with second inlets in said plenum and second outlets outside of said chamber.

8. The apparatus of claim 1 further including a nozzle to said plenum for passing fluidizing gas to said plenum through a plenum inlet.

9. The apparatus of claim 6 wherein said first inlet has a smaller inner diameter than said first outlet of said first nozzle and said second inlet has a smaller inner diameter than said second outlet of said second nozzle.

10. The apparatus of claim 1 wherein said plenum has a rounded bottom and a flat top.

11. The apparatus of claim 10 wherein said flat top comprises a blind flange that is connected to an outer flange of said wall of said riser.

12. The apparatus of claim 11 wherein said first nozzle and said second nozzle extend through said flat top.

13. The apparatus of claim 11 wherein an outer wall of said chamber is connected a top of said flat top.

14. An apparatus for fluid catalysis comprising:
a riser;
a first catalyst inlet in said riser;
a second catalyst inlet in said riser;
a plenum located at a bottom of said riser;
a chamber in said riser between said first catalyst inlet and said second catalyst inlet and an opening in an outer wall of said chamber; and
a first nozzle in said plenum with a first outlet in said chamber;
a second nozzle in said plenum with a second outlet outside of said chamber.

15. The apparatus of claim 14 wherein a first catalyst conduit is connected to said riser at said first catalyst inlet and a second catalyst conduit is connected to said riser at said second catalyst inlet.

16. An apparatus for fluid catalysis comprising:
a riser;
a plenum located at a bottom of said riser;
a chamber in said riser; and
a first nozzle with a first inlet in said plenum and a first outlet in said chamber;
a second nozzle with a second inlet in said plenum and a second outlet outside of said chamber.

17. The apparatus of claim 16 further including a conduit to said plenum for passing fluidizing gas to said plenum through a plenum inlet.

18. The apparatus of claim 16 wherein said plenum has a rounded bottom and a flat top comprising a blind flange that is connected to an outer flange of a wall of said riser.

19. The apparatus of claim 18 wherein said first nozzle and said second nozzle extend through said blind flange.

20. The apparatus of claim 18 wherein an outer wall of said chamber is connected a top of said blind flange.

* * * * *